June 24, 1958   H. B. NOYES   2,840,265
CURRENCY DISPENSING APPARATUS
Filed Jan. 11, 1954   7 Sheets-Sheet 1
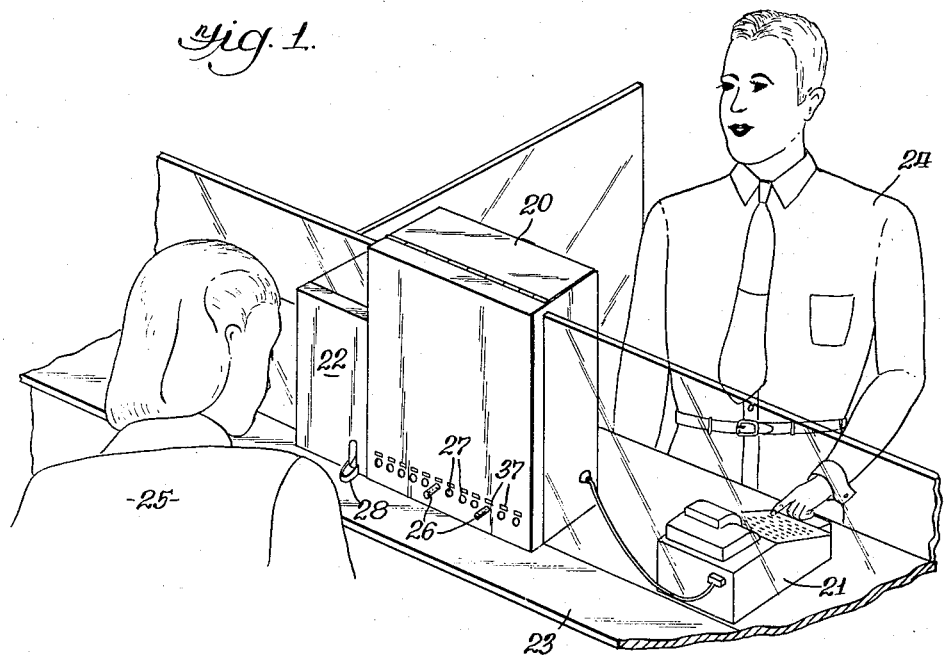
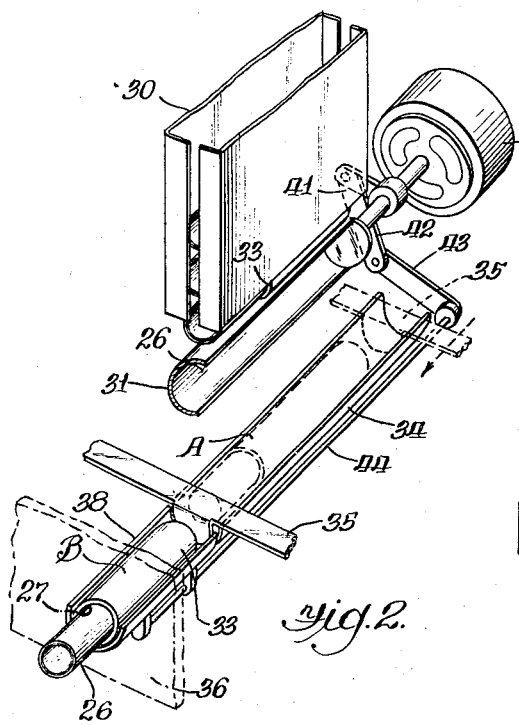
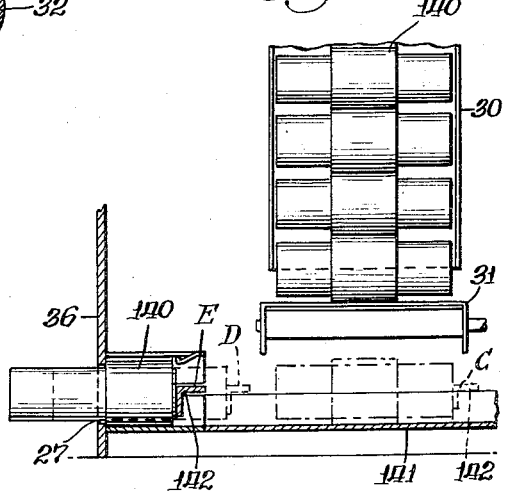
INVENTOR.
Hiland B. Noyes
BY
Mueller & Aichele
Attys.

June 24, 1958
H. B. NOYES
2,840,265
CURRENCY DISPENSING APPARATUS
Filed Jan. 11, 1954
7 Sheets-Sheet 2
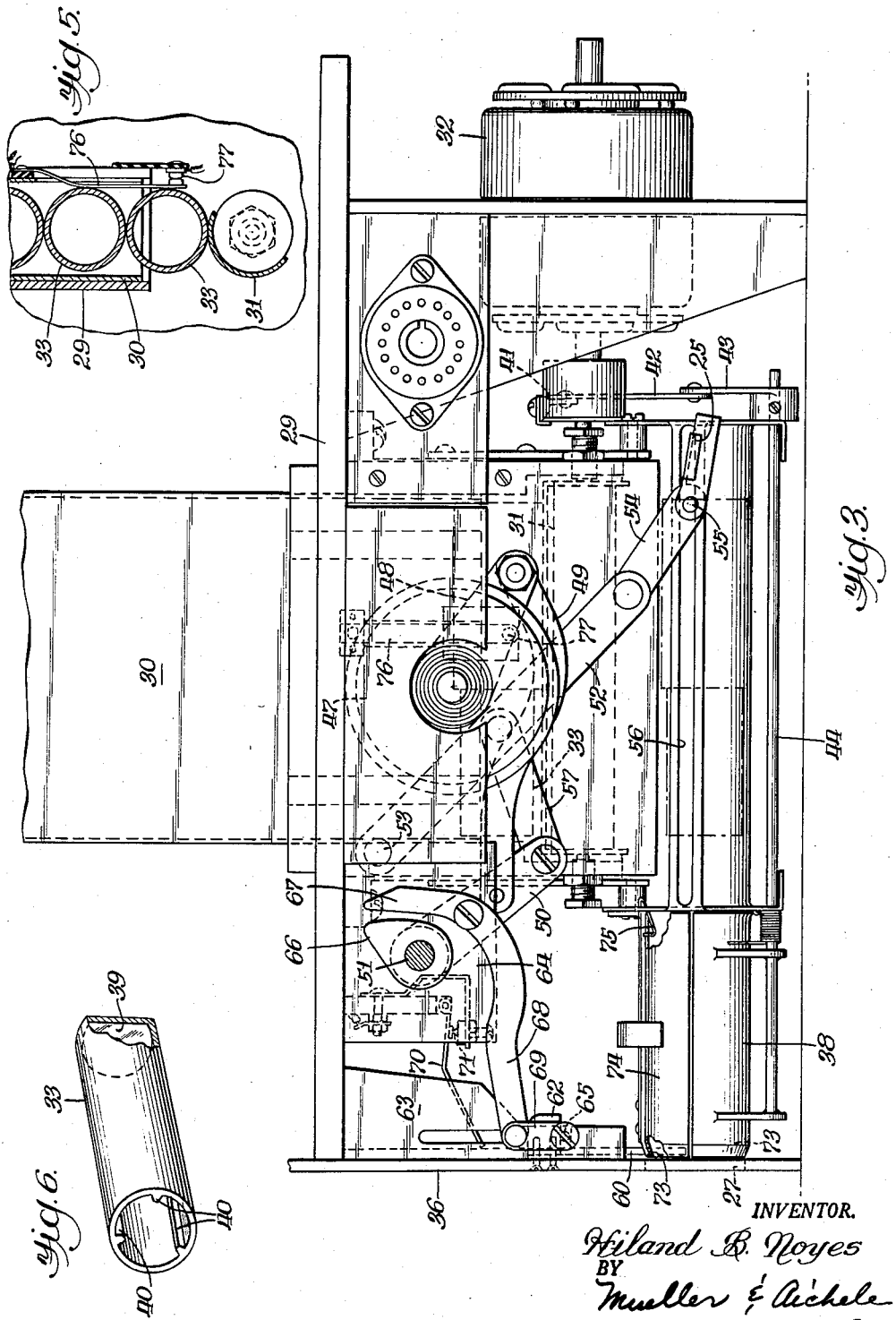
INVENTOR.
Hiland B. Noyes
BY
Mueller & Aichele
Attys.

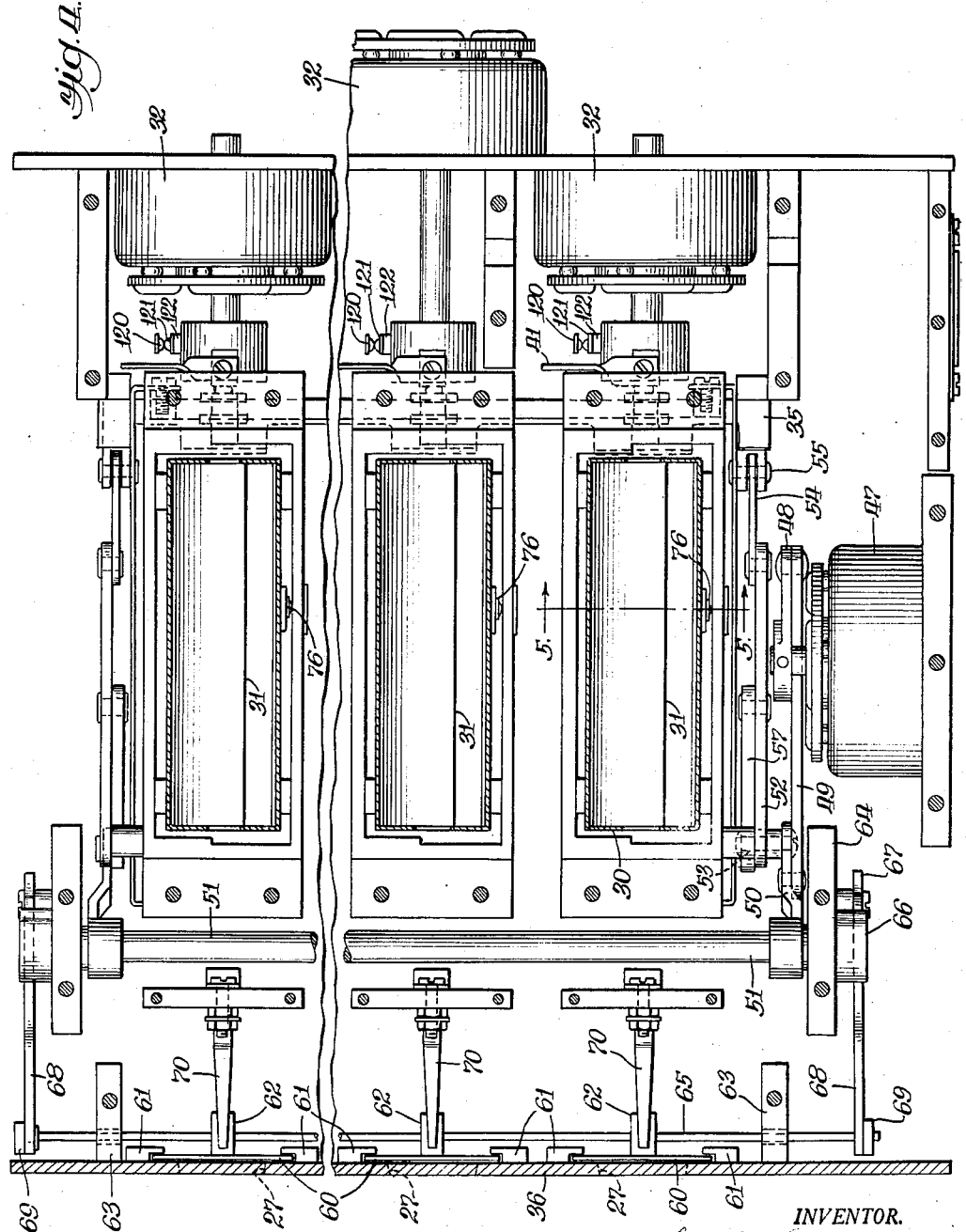

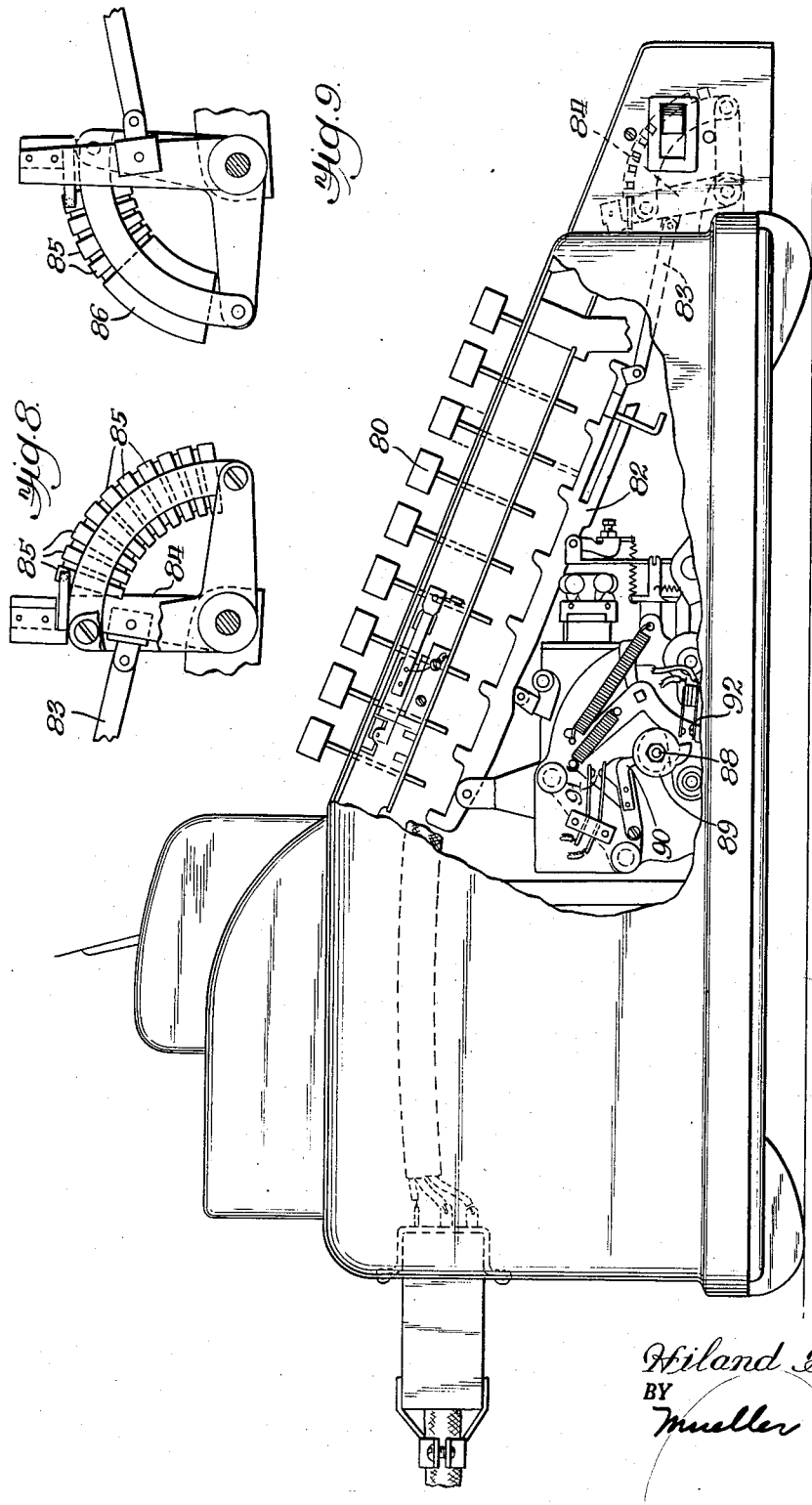

June 24, 1958 H. B. NOYES 2,840,265
CURRENCY DISPENSING APPARATUS
Filed Jan. 11, 1954 7 Sheets-Sheet 7

INVENTOR.
Hiland B. Noyes
BY
Mueller & Aichele
Attys

United States Patent Office 2,840,265
Patented June 24, 1958

2,840,265

CURRENCY DISPENSING APPARATUS

Hiland B. Noyes, Western Springs, Ill., assignor to Hiland B. Noyes and Emerson E. Fies, a partnership doing business as Noyes and Fies, Western Springs, Ill.

Application January 11, 1954, Serial No. 403,306

9 Claims. (Cl. 221—9)

This invention relates generally to dispensing systems and more particularly to apparatus for dispensing currency or other articles which have been provided in containers. This application is a continuation in part of my copending application Serial No. 167,607, filed June 12, 1950, now Patent No. 2,805,675.

In the past, a considerable amount of time of bank tellers, cashiers in restaurants and grocery stores, and the like, has been taken up with the dispensing of paper currency. For example, if a bank teller desired to pay a sum of currency involving paper bills, it was necessary for the teller to count out the desired sum of paper currency manually. To provide the desired accuracy, it has been common practice for tellers to count such paper currency twice. Therefore, a great deal of time of the teller has been taken up in counting out the paper currency, and this seriously limits the number of accounts that such a person could handle within a given period of time.

It is apparent from the above that an automatic dispensing system which operates reliably to dispense currency in the form of paper bills will result in a great saving of time of such a teller or other person who must pay out money. Although automatic paper currency dispensing apparatus has been proposed in the prior art, such apparatus has not been commercially satisfactory. This is because such apparatus has not been sufficiently accurate and reliable, and has been of complicated and expensive construction.

It is therefore an object of the invention to provide an improved currency dispensing device which is of simple and inexpensive construction and which is rapid and reliable in operation.

A further object of the invention is to provide a paper currency dispensing device which is easily controlled, and which is of such construction that the possibility of errors in the amount of currency delivered is reduced to a minimum.

Another object of the invention is to provide dispensing apparatus which may be controlled so that a selected amount of paper currency can be withdrawn therefrom by a person to be paid.

A still further object of the invention is to provide an apparatus for dispensing compact packages of paper currency comprising cylindrical containers having rolled paper money of various different denominations therein.

A feature of this invention is the provision of a currency dispensing system including currency dispensing apparatus for containing currency and dispensing the same in accordance with the amounts tabulated on a controlling device which may be a standard adding machine or similar machine with relatively simple modifications.

A further feature of the invention is the provision of currency dispensing apparatus which selectively feeds paper currency to particular positions and opens closures associated with the positions so that the desired amount of currency can be withdrawn from the apparatus.

A still further feature of the invention is the provision of paper currency dispensing apparatus including a plurality of receptacles for containing compact packages of paper currency arranged in groups of different denominations, and movable gate means coacting with the receptacles and with a control device for dispensing the desired amount of paper currency. The receptacle may include removable magazines and lockout switch means for preventing operation of the control device when a magazine is removed or is empty.

Another feature of this invention is the provision of a paper currency dispensing device for dispensing currency provided in tubular containers having at least one open end from which the currency extends, with the device including means for feeding the containers individually to a first position and then moving the same longitudinally to a second position at which the currency extends from the dispensing device for removal from the container and from the device. The container may be released from the second position after the currency is withdrawn and simultaneously with the feeding of the next container. A plurality of such devices may be provided in an apparatus with each including containers having a predetermined sum of money therein.

Other objects, features, and the attending advantages of this invention will be better appreciated as the same becomes understood from the following detailed description considered in connection with the accompanying drawings, wherein:

Fig. 1 is a perspective view of the physical arrangement of the currency dispensing system showing its use;

Fig. 2 is a schematic drawing illustrating the operation of the dispensing apparatus;

Figs. 3, 4 and 5 illustrate the structure of the dispensing apparatus;

Fig. 6 illustrates a container for use in the dispensing apparatus;

Figs. 7, 8, 9 and 10 illustrate the control unit of the dispensing system;

Fig. 11 is a circuit diagram of the dispensing system;

Figure 10:
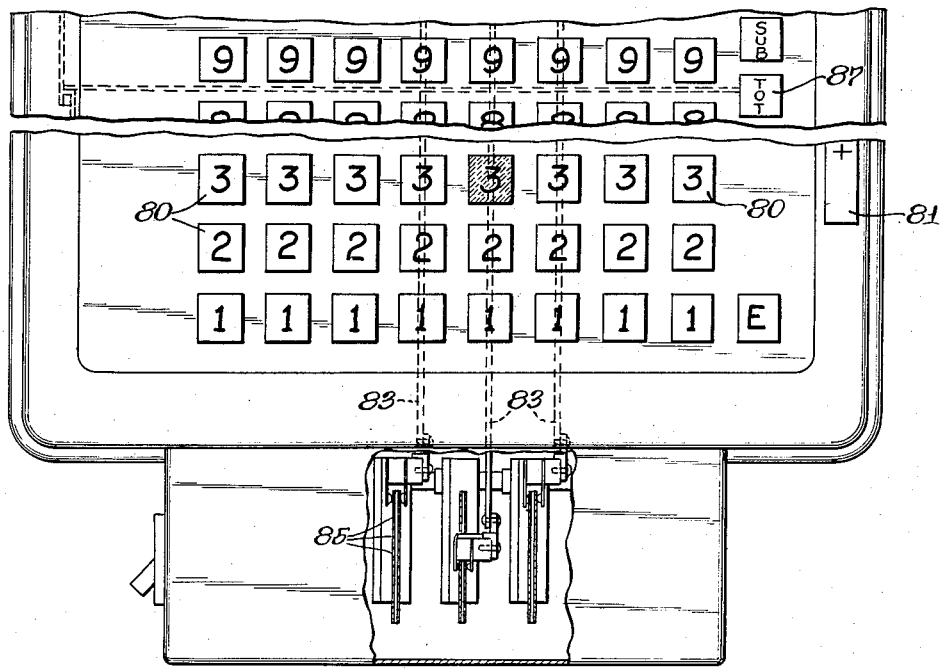

In practicing the invention a system is provided for dispensing currency in accordance with amounts recorded on a machine having keys for setting up predetermined amounts to be tabulated. The system includes dispensing apparatus having a plurality of receptacles for holding currency of different denominations, and means for providing a selected amount of currency at positions from which it may be withdrawn from the apparatus. For controlling the dispensing of currency from said apparatus in amounts set up on the controlling machine, electrical control circuits are provided operatively interconnecting the machine and the gate means of the dispensing apparatus. The paper currency is formed into rolls which may be placed into containers adapted to be received within the magazine. The containers may be cylindrical with one end open and one end closed, or may be tubular bands or rings. The controlling machine causes the operation of gate means to dispense a plurality of rolls to make up a desired amount. The apparatus may discharge the containers with the rolled currency therein at a position to be received, or may position the containers so that the rolls extend from the apparatus and may be withdrawn from the containers while they remain in the machine. Closures may be provided over openings in the apparatus to prevent unauthorized withdrawal of currency therefrom. Lockout switch means may also be provided for rendering the system inoperative when a removable magazine forming a part of the receptacle portions is removed or empty, or in the event a container does not drop clear of the gate means, or a roll of currency is not withdrawn by the payee.

Referring now to the drawings, in Fig. 1 there is illustrated a currency dispensing system in accordance with the invention. This system may be used in a bank or other place where money is paid out, or for paying out change at a store, restaurant or the like. As previously stated, the system includes dispensing apparatus 20 for handling paper currency which is controlled by a machine 21 in which the amount is set up, such as an adding machine or the like. Coins may also be dispensed by the apparatus 22 which may be controlled by the same adding machine 21. These devices may be placed on a counter 23 for operation by a teller 24 behind the counter, and may dispense currency and coin to a person 25 being paid at the front of the counter. It will be noted that currency is fed as rolls 26 which extend through openings 27 in the front of the dispenser 20. The amount of currency to be paid at each opening 27 may be indicated above the opening as shown at 37. Coin may be fed to a cup 28 where it can be easily picked up. The system for dispensing coins and currency is disclosed in my copending application Serial No. 167,607, filed June 12, 1950. This application is directed more particularly to the device for dispensing paper currency.

For a more specific disclosure of the currency dispensing apparatus reference is made to Figs. 2, 3, 4 and 5. The dispensing apparatus includes a frame 29 on which are supported a plurality of removable magazines 30, each of which contains rolls of paper currency with the rolls in each magazine being of a predetermined denomination. The magazines have open ends at which gates 31 are provided for releasing the rolls one at a time. In the drawings the magazines are positioned vertically with the gates at the bottom for dropping one roll or container therefrom at a time. It is to be pointed out, however, that the gates may be positioned horizontally or in other positions and that in addition to feeding downwardly the rolls could be fed upwardly or from the side by suitable tensioning devices.

Fig. 2 is a schematic disclosure illustrating the operation of the apparatus. The gate 31 is illustrated as a cradle which is connected to a rotary solenoid or motor 32. The cradle 31 normally holds the containers 33 from dropping, and rotation of the cradle causes a container to drop therein and then as the cradle returns, the container drops into the trough 34. The cradle holds the next container from dropping until the cradle is again actuated.

The container in the trough 34 may then be engaged by a push bar 35 which moves the container forwardly from the position A to the position B. It will be noted that the container 33 includes a roll of paper currency 26 therein which extends from one end thereof. When the roll has been moved from position A to position B, the currency 26 will extend through the opening 27 in the front plate 36 of the device to be withdrawn from the apparatus. As the container is moved from position A to position B by the push bar 35, it is slid from the fixed trough 34 to a movable receiving trough 38. This trough is arranged to be operated by the solenoid 32 so that the empty container is dropped during the next operation of the machine at which another container is released from the same magazine. The push bar 35 may cooperate with a plurality of troughs into which rolls are fed from a plurality of receptacles, and may be driven in a manner to be described so that it operates after a plurality of gates or cradles have been rotated to dispense the desired amount of currency.

It will be apparent that the empty containers which are discharged can be re-used so that the cost of the containers is thereby minimized. The containers may be made of any suitable material such as cardboard, plastic, or metal, being preferably of a relatively rigid material so that the handling and dispensing thereof is facilitated. As shown in Fig. 6, the containers 33 may have one closed end 39. Also, ridges or rifles 40 may be provided on the inner cylindrical surface to reduce the frictional engagement between the currency and the container to facilitate removal of the currency therefrom. The use of a rigid container also facilitates placing the currency therein and further, makes it easier to hold the container in a fixed position as the currency is withdrawn therefrom. The container can have substantial weight to facilitate feeding in the machine and can be of fairly expensive construction since the containers are used many times and the cost thereof will be distributed over a large number of operations. Because the containers may be relatively rigid, the feeding may be by a mechanical means exerting pressure so that the magazines will not necessarily be vertical with the containers being fed downwardly. The containers may be fed upwardly or in any desired direction with followers for forcing the containers to the gate end thereof.

As previously stated, Figs. 3 and 4 show one construction of the dispensing mechanism. As shown in Fig. 4, the gate 31 of each of the dispensing portions is driven by an individual solenoid 32. Although only three gates and solenoids are illustrated, any number may be provided and as will be fully set forth hereinafter, it is proposed to use twelve dispensing portions to provide payment of any sum from one dollar to $299. The solenoids 32 may be controlled by any suitable mechanism and a system for operation with an adding machine or the like is illustrated and will be described. The solenoids 32 will operate the gates 31 and also operate the container receiving troughs 38 through the linkage including arms 41 connected to the shaft of the solenoid 32, connecting link 42, and the arm 43 which is connected to shaft 44 which supports the receiving trough 38.

As best shown in Fig. 3 the push bar 35 is operated by a motor or solenoid 47. The solenoid has an arm 48 connected to a link 49 pivoted to arm 50 which has one end thereof fixed by the pivotal mounting 51. The arm 50 drives link 57 which in turn drives arm 52 having one end pivoted at 53. The arm 52 is coupled through link 54 and the pivotal connection 55 to the push bar 35. The pivot 55 and the push bar 35 are guided within the slot 56 so that linear movement thereof is provided.

The solenoid 47 in addition to operating the push bar 35 also cooperates to lift closures 60 provided back of each opening 27 in the front plate 36. These closures are provided in individual guides 61 as shown in Fig. 4. Each of the closures 60 has a projection 62 thereon which serves the double purpose of lifting the closure and operating the interlock switch. For operating the projections 62 a rod 65 is provided which operates in guides 63. The rod 65 extends all the way across the machine and engages all the projections 62 of all the closures. The rod 65 is operated by a cam 66 provided on the shaft 51 and engages one end of an arm 67 pivoted on the mounting block 64. The arm 67 has a second end 68 which is connected to a link 69 by which the rod 65 is supported. Accordingly, as the solenoid 47 operates and the arm 50 is pivoted, the cam 66 will engage the end of arm 67 to cause the end 68 to rise to lift the rod 65 and engage all of the projections 62 to lift all of the gates 60. This will open all of the openings 27 so that rolls of currency may be fed therethrough at all the dispensing portions at which a container has been released.

As previously stated, the projections 62 may also operate switches to provide an interlock so that the dispensing system is disabled in the event that any gate 60 is held open. It will be apparent that the gates 60 will be held open by the currency extending through the opening 27 until the same is removed. The interlock is provided by a switch formed by arm 70 and contact 71 (Fig. 3). The arm 70 is positioned to be engaged by the projection 62 so that when the closure 60 is raised, the connection between arm 70 and contact 71 will be broken.

To facilitate withdrawal of the currency from the dispensing device, it is desired that the container 33 be held against longitudinal movement when it is at the position B at which the currency is to be withdrawn. This is provided by the inturned edges 73 at the front of the trough 38 and at the front of a cover plate 74. To hold the container so that it does not push backwardly as money is withdrawn, a latch 75 is provided which is resilient to spring out of the way to permit the container to reach the position B but then prevents backward movement of the container.

As shown in Fig. 5, an interlock switch is provided to indicate the presence of containers to be released. This includes an arm 76 held in engagement with the contact 77 by the containers 33. The arm extends through slots in the frame 29 and the magazine 30 and will open either when a magazine is removed or is empty.

It may be desired to provide additional interlocking provisions to disable the system in the event that a container or roll dispensed does not clear the cradle or gate and permit it to return to its normal position. This may be accomplished by the provision of a switch coupled to each solenoid 32 as shown in Fig. 4, with the switches including contacts 120 and 121 which are closed by projection 122 when the solenoid is in its normal position, and which are open when the solenoid is in any other position since the projection 122 does not hold the contacts together.

The device for operating the dispensing apparatus is shown in the prior application referred to above and is also disclosed in Figs. 7, 8, 9 and 10. This may consist of an adding machine or other similar machine having keys 80 on which the amounts to be registered are set up, and members 82 which move in accordance with the amount set up or with an amount produced in the machine as by adding a plurality of amounts. A bar 81 which causes the machine to operate and a totalizer key 87 is provided. The member 82 of the control mechanism is coupled through links 83 to switch structures each of which includes a movable arm 84 and a plurality of fixed contacts 85. A plurality of switches may be provided depending upon the number of digits to be used. In the system described wherein payment of currency from one to $299 is provided three such switches are required for the units, tens and hundreds digits respectively.

In Figs. 8 and 9 the two sides of the switches used for units and tens digits are illustrated. As shown in Fig. 8 on one side of the switch nine separate contacts 85 are provided for the nine positions within the digit. On the other side only five are provided; four individual contacts 85 for the first four positions and a single long contact 86 for the last five positions in the digit. As will be apparent from the circuit of Fig. 11, this is arranged so that when a digit of more than five occurs, both the five and one of the lower digits will be connected to dispense two containers with the required amount. As an example, for the digit 8, both the five and the three contact will be connected. Accordingly, the longer contact 86 shown in Fig. 9 is used so that two containers will be dispensed for the larger digits.

The switch connected to the hundred digit may be exactly the same as for the units and tens, except only the first two contacts 85 are provided as only containers having $100 and $200 are provided. However, in the event that it will be desired to dispense amounts up to $900, the construction of the switch for the hundreds digit could be exactly the same as for the units and tens digits illustrated in Figs. 8 and 9. Also, it is obvious that larger amounts could be dispensed by applying switches to the thousands and higher digits of the machine. Similarly, switches may be applied to the cents digits on the machine to dispense coin currency if this is desired.

The machine of Fig. 7 is also utilized to provide timing operations. Such a machine includes a motor providing a cycle of rotation as the machine is operated to add, subtract or the like. The shaft which provides a cycle is indicated in Fig. 5 as 88. A cam 89 is provided on this shaft which has a projection first engaging the follower 90 to close the switch contacts 91 and thereafter engaging the contacts 92 to close these.

Considering now the over-all operation of the dispensing system, reference is made to Fig. 11 which shows the complete circuit. Standard alternating current energy is applied to the terminals 100 and operates both the adding machine or the like and the dispensing device. Switch 101 has two positions; the solid position for causing operation of the dispensing system, and a dotted position for causing operation of the adding machine only. In the dotted position the adding machine motor 102 is energized each time the switch 81 is actuated by the plus bar on the machine.

When the switch 101 is in the solid position for operation of the dispensing system, energy is applied from the source 100 through contacts $a$ and $b$ of the connectors at the adding machine and at the dispensing apparatus which applies alternating current across the rectifier bridge at the dispensing apparatus. This provides alternating current at the points 103 and 104 which is converted to direct current between points 105 and 106. The direct current potential from point 105 is applied through contacts $c$ of the connectors through the totalizer switch 110 and the timing switch 91 to the movable contacts 84 of the three switches which provide the units, tens and hundreds amounts. Connection from the fixed contacts are made through the connections $d$, $e$, $f$, $g$, $h$, $i$, $j$, $k$, $l$, $m$, $n$, and $o$ to the twelve solenoids which are numbered 1, 2, 3, 4, 5, 10, 20, 30, 40, 50, 100 and 200 to correspond to the amounts to be dispensed thereby. The return connection from all of the solenoids at point 111 is returned through contacts 112 of relay 114 to the direct current point 106.

It is therefore seen that as the movable contact 84 engages any of the fixed contacts of the switches and then the timing switch 91 operates, the required dispensing solenoids will be energized. After the dispensing solenoids are energized, the push bar solenoid 47 will be energized when the timing cam 89 has progressed further in its cycle to close contacts 92. This circuit extends from direct current point 105 through connections $c$ and the switch contacts 92 back through contacts $p$ to the solenoid 47. The return connection from the solenoids 47 is from point 111 through the contacts 112 to point 106.

As previously stated, it is desired to interlock the system so that in the event a dispenser magazine is empty or is removed from the device, the system will be completely inoperative. This action is accomplished through the relay coil 114 and contacts 112 and 115. The relay 114 may be an alternating current relay connected from the terminal 103 through the contacts 76 and 77 of each of the dispensing devices. These contacts will be normally closed and will be opened when the dispenser magazine is removed or is empty so that the connection to the relay coil 114 will be broken to open the contacts 112 and 115. The contacts 120 and 121 of all the solenoids 32 are connected in the interlock circuit with the contacts 76 and 77 to relay 114 to normally hold this relay energized. The contacts 70 and 71 coupled to the closures at the openings for the rolled currency may also be connected to the series circuit controlling relay 114. The other side of this circuit is connected to the other alternating current terminal 104.

Opening any of the series interlock contacts will release the relay 114 to open the contacts 112 and 115. Opening of contacts 112 will de-energize the solenoids driving both the dispensing gates and the push bar as will be apparent from the previous description. Contact 115 completes the circuit to the adding machine motor which circuit continues from the 110 volt source through contacts *q* to the switch 115 and through contacts *r* back to the motor 102. Accordingly, when the lockout relay is opened, the adding machine also is disabled so that it is not possible to start operation of the system. It is to be pointed out that the interlocking action may be provided in other ways, and that the various interlocks could be separated and used to control independent relays instead of a single relay. Also the relay 114 may include additional contacts controlling a light or other indicating means to indicate that the apparatus is disabled.

Figure 12:
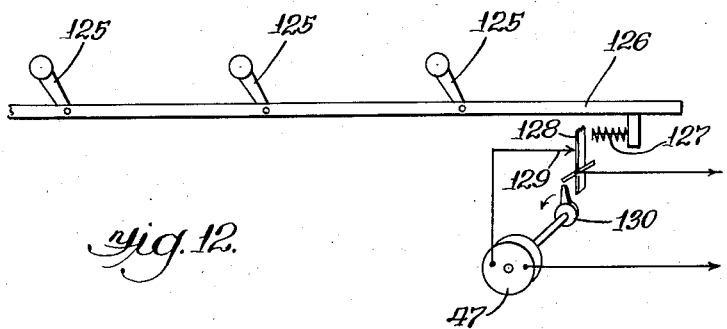
Fig. 12 illustrates an alternative embodiment of the push bar control.

In Fig. 12 there is illustrated a modification of the invention wherein the second timing switch 92 in the adding machine or other controlling device is eliminated and replaced by switch means in the dispenser itself. In this structure arms 125 are provided on the shafts of the solenoid 32 which operate the gates or cradles. Operation of one or more of the solenoids 32 will cause movement of the associated arms 125 to slide the bar 126 to the left. The bar includes a spring 127 adapted to engage switch arm 128. Accordingly, when the solenoids are operated to drop containers, the spring 127 moves the switch 128 to the position to engage contact 129. This energizes the solenoid or motor 47 which operates the push bar 35. Coupled to the solenoid 47 is a cam 130 which is also adapted to engage the switch arm 128. When the solenoid 47 operates and rotates in a counterclockwise direction, just before it reaches the end of its movement, it will engage the bottom of the switch arm 128 to move it in a position away from the contact 129 to thereby de-energize the solenoid. It is to be pointed out that a motor may be used in place of the solenoid 47 and may have the advantage of a slower and smoother movement.

Figure 13:
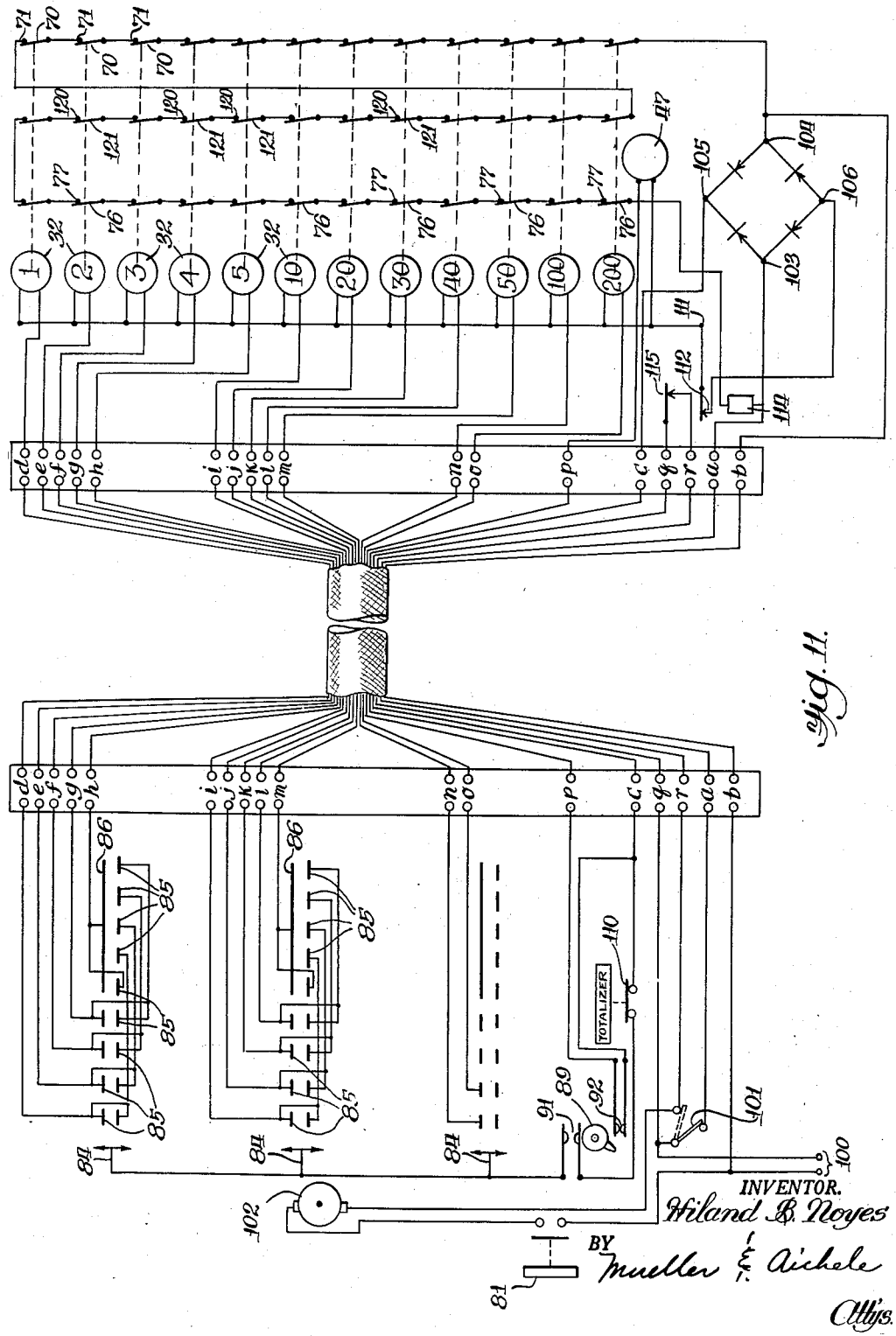
Fig. 13 illustrates dispensing apparatus for use with rolled currency provided in bands.

In Fig. 13 there is illustrated the use of the dispensing apparatus with currency which is rolled and inserted into rigid bands. The bands 140 may be of a length of the order of one-half to one-fourth the length of the rolled currency, and may be generally similar to napkin rings although smaller in diameter. The currency rolled and in bands may be provided in the magazines 30 in the same manner as previously described. The currency may be released by gates 31 as previously described and dropped into a trough 141 which is generally similar to the trough 34 but is longer extending nearer to the front plate 36. The push bar 142 is generally similar to the push bar 35 and moves from an original position C to a position D at which the end of the currency extends through the opening 27 as in the prior embodiment. However, the push bar is arranged to move farther forward to the position E and during the movement from position D to position E, the currency is slid forward within the ring 140 so that it projects further through the opening 27. This results in the paper projecting outwardly at the front of the machine to a greater distance which may facilitate the removal of the currency therefrom.

Figure 14:
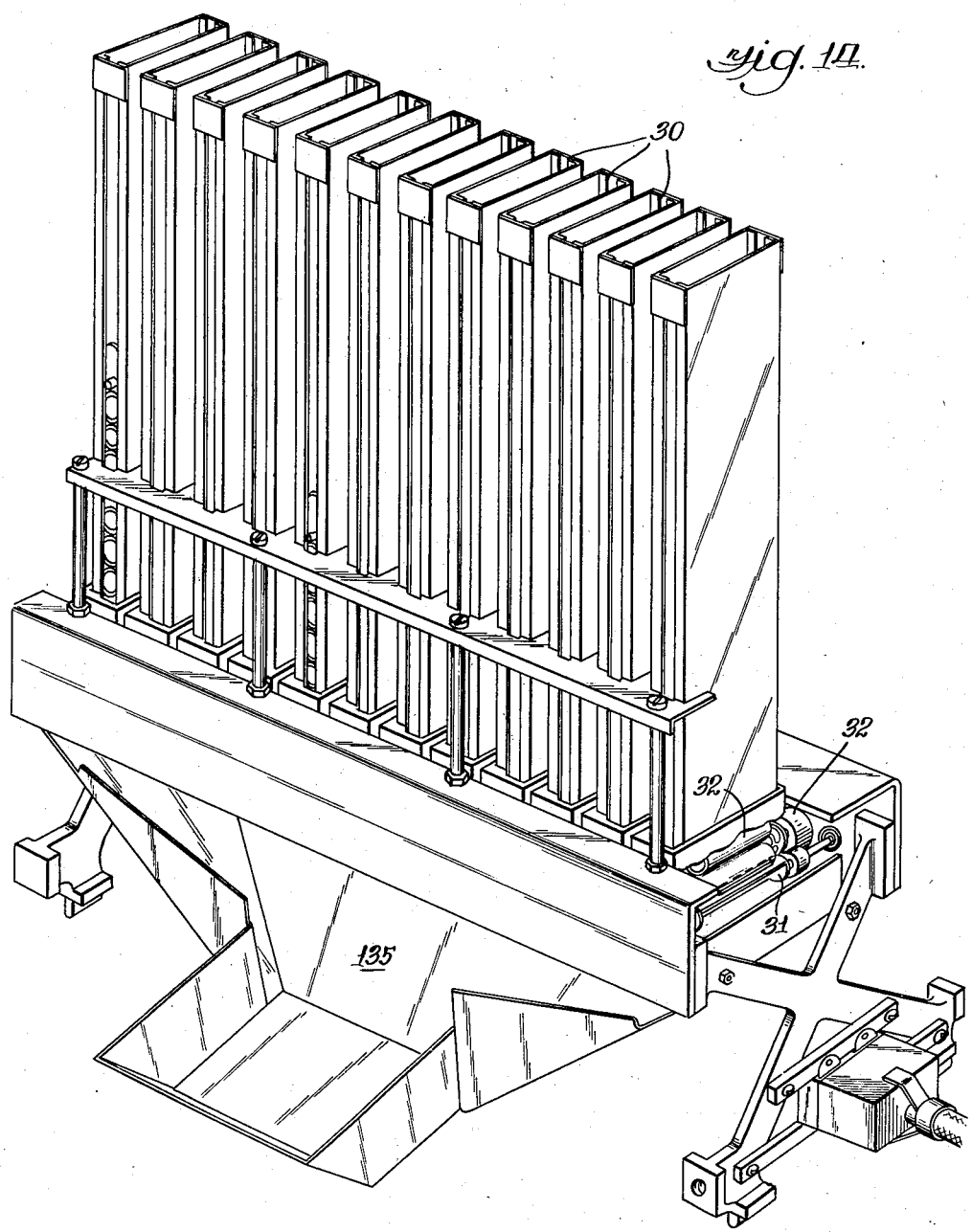
Fig. 14 illustrates another embodiment of the dispensing apparatus.

In Fig. 14 there is illustrated a still further embodiment of the invention wherein the packages are dropped from the gates into a chute. Fig. 14 illustrates a plurality of magazines 30 which may be arranged in exactly the same manner as in the prior embodiments. The cradle releasing gates and driving means therefore may be exactly the same as in the previously described embodiment and the control circuit may be exactly the same. However, the push bar is eliminated since the packages are merely dropped from the gates into a chute 135 where they may be picked up by the person being paid. In such an arrangement the person being paid would take the paper currency in the containers which would thereafter be destroyed. The containers could show on the outside the amount of currency therein to provide a further check on the correct payment and make it easier for the person paid to check the amount of money he had actually received.

It will therefore be apparent that the dispensing apparatus in accordance with the invention makes it possible to automatically dispense paper currency in an accurate and reliable manner. Currency may be provided in tubular containers to be picked up by the person being paid, or may be fed for the person to withdraw from openings as rolls without a container or the like. The apparatus may include interlocks so that the entire equipment is disabled in the event that the proceeding operation was not satisfactorily completed or that currency is not available in the apparatus for further operation. In addition to disabling the machine, indicating lights or the like may be provided to indicate improper operation of the apparatus.

The dispensing apparatus operates rapidly and may be coupled to a standard machine on which the amount being paid may be recorded. Accordingly, a teller in the bank need perform only one operation; that is, entering the amount on a machine which records the amount and the amount will be automatically paid to the payee.

Although certain embodiments of the invention have been disclosed which are illustrative thereof, it is obvious that changes and modifications can be made therein without departing from the intended scope of the invention as defined in the appended claims.

I claim:

1. Dispensing apparatus for dispensing paper currency which has been placed in tubular containers having open ends, with the currency being rolled and inserted in the containers and extending from the open ends thereof, said apparatus including in combination, housing means having an opening therein, means for containing a plurality of containers with rolled currency therein, controlled means for moving the containers individually to a first position, means for engaging the end of the rolled currency in a container at said first position for moving said currency to a second position at which said currency extends through said opening in said housing, means in the path of movement of the container for currency moved to said second position for holding said container in a fixed position with said currency being moved with respect to said container as it moves to said second position, and means for releasing the container from said fixed position simultaneously with the movement of an additional container to said first position.

2. Dispensing apparatus for dispensing paper currency which has been placed in tubular containers having open ends, with the currency being rolled and inserted in the containers and extending from the open ends thereof, said apparatus including in combination, housing means having an opening therein, means for containing a plurality of containers with rolled currency therein, controlled means for moving the containers individually to a first position, and means for engaging the end of the rolled currency in a container at said first position for moving said currency to a second position at which said currency extends through said opening in said housing, and means positioned in the path of the container for the currency moved to said second position for holding said container in a fixed position with the currency moving with respect to the container as it moves to said second position.

3. A dispensing device for dispensing paper currency which has been placed in elongated tubular containers having an open end, with the currency being rolled and inserted in the containers and extending from the open end thereof, said device including in combination, a frame structure including housing means having an opening therein, a movable closure for said opening, magazine means supported on said frame structure for containing a plurality of containers with rolled currency therein, gate means for controlling the movement of the containers individually to a first position, means for opening said closure and engaging a container at said first position for moving the same longitudinally to a second position at which further longitudinal movement is prevented, with the rolled currency in a container at said second position extending through said opening in said housing means for removal therefrom, and means for releasing the container from said second position simultaneously with the movement of an additional container to said first position.

4. A dispensing device for dispensing paper currency which has been placed in elongated tubular containers having an open end, with the currency being rolled and inserted in the containers and extending from the open end thereof, said device including in combination, a frame structure including housing means having openings therein, movable closures for said openings, a plurality of magazines removably supported on said frame structure each being adapted to receive a plurality of containers with rolled currency therein, a plurality of gate means individually associated with said magazines for controlling the movement of the containers individually to first positions, means for opening said closures and for moving containers at said first positions longitudinally to second positions at which further longitudinal movement thereof is prevented, with the rolled currency in containers at said second positions extending through said openings in said housing means for removal therefrom, and means for releasing the containers from said second positions simultaneously with the movement of additional containers to said first positions.

5. A dispensing device for dispensing paper currency which has been placed in elongated tubular containers having an open end, with the currency being rolled and inserted in the containers and extending from the open end thereof, said device including in combination, a frame structure including housing means having openings therein, movable closures for said openings, a plurality of magazines removably supported on said frame structure each being adapted to receive a plurality of containers with rolled currency therein, a plurality of gate means individually associated with said magazines for controlling the movement of the containers individually to first positions, means for opening said closures and for moving containers at said first positions longitudinally to second positions at which the rolled currency extends through said openings in said housing means for removal therefrom, means for operating said gate means to control the currency dispensed, and lockout means responsive to opening of a closure to disable said operating means.

6. A dispensing device for dispensing paper currency which has been placed in elongated tubular containers, said device including in combination, a frame structure, a plurality of magazines removably supported on said frame structure, each being adapted to receive a plurality of containers with rolled currency therein, a plurality of gates individually associated with said magazines and operatable to release the containers therefrom individually, electrical means for operating said gate means to control the currency dispensed, first lockout means responsive to operation of a gate, and second lockout means responsive to removal of a magazine and to an empty magazine, said lockout means being connected to said electrical means for disabling the same.

7. Dispensing apparatus for dispensing paper currency which has been placed in elongated tubular containers having an open end, with the currency being rolled and inserted in the containers and extending from the open end thereof, said device including in combination, a frame structure including housing means having openings therein, movable closures for said openings, a plurality of magazines removably supported on said frame structure each being adapted to receive a plurality of containers with rolled currency therein, a plurality of gates individually associated with said magazines and operatable to cause movement of the containers individually to first positions, means for opening said closures and for moving containers at said first positions longitudinally to second positions at which rolled currency extends through said openings in said housing means for removal therefrom, electrical means for operating said gate means to control the currency dispensed, first lockout switch means responsive to opening of a closure, second lockout switch means responsive to operation of a gate, third lockout switch means responsive to removal of a magazine and to an empty magazine, and a control circuit including said lockout switch means connected to said electrical means for selectively operating the same, said control circuit being de-energized by operation of any one of said lockout switch means for disabling said dispensing apparatus.

8. A paper currency dispensing machine including in combination, a housing, a plurality of receptacles positioned on said housing for receiving a plurality of compact cylindrical packages of rolled paper currency, a cylindrical sleeve partially broken away to form a cradle closing one side of each of said receptacles, said cradle being rotatable from a first position in which the broken away portion faces the interior of said receptacle for receiving a package to a second position in which the broken away portion of the cradle is positioned to empty the contents thereof, and electrical driving unit for each of said receptacles having a rotatable armature connected to a cradle for selectively rotating the same, and electrical control means connected to said driving units for selectively energizing the same, said electrical control means including lockout circuit means coupled to said cradles to disable said electrical control means when said cradles are moved from said first position.

9. A paper currency dispensing machine including a housing, a plurality of magazine receiving chambers on said housing, each of said chambers having an accessible opening in one side thereof, movable gate means closing the side of each of said chambers opposite said accessible opening, an electric solenoid operatively connected to each of said gate means for moving the same, control means including an electrical circuit and a source of electricity for selectively energizing said solenoids, an open end elongated magazine removably seated in the accessible opening of each of said magazine receiving chambers, each of said magazines containing a plurality of compact packages of paper money of a predetermined denomination, lockout electric switch means mechanically connected to each of said chambers and electrically connected in said electrical circuit, said lockout switch means being actuated in response to removal of the magazine from the associated chamber and in response to said magazine becoming empty to de-energize said circuit.

References Cited in the file of this patent

UNITED STATES PATENTS

| | | |
|---|---|---|
| 750,718 | Spear | Jan. 26, 1904 |
| 1,272,224 | Combs | July 9, 1918 |
| 1,359,696 | Greene | Nov. 23, 1920 |
| 2,149,099 | Phinney | Feb. 28, 1939 |
| 2,215,642 | Gabrielson | Sept. 24, 1940 |
| 2,549,081 | Hall | Apr. 17, 1951 |